United States Patent [19]
Nakatani

[11] Patent Number: 5,313,486
[45] Date of Patent: May 17, 1994

[54] DISCHARGE EXCITATION PULSED LASER OSCILLATION DEVICE

[75] Inventor: Hajime Nakatani, Amagasaki, Japan
[73] Assignee: Mitsubishi Denki Kabushiki Kaisha, Tokyo, Japan
[21] Appl. No.: 872,455
[22] Filed: Apr. 23, 1992
[30] Foreign Application Priority Data
Apr. 25, 1991 [JP] Japan .................. 3-095193
[51] Int. Cl.$^5$ .............................. H01S 3/097
[52] U.S. Cl. ........................ 372/86; 372/87; 372/69
[58] Field of Search ............... 372/86, 87, 69, 81
[56] References Cited

U.S. PATENT DOCUMENTS

| | | | |
|---|---|---|---|
| 4,380,079 | 4/1983 | Cohn et al. | 372/87 |
| 4,611,327 | 9/1986 | Clark et al. | 372/86 |
| 4,677,638 | 6/1987 | Beaupere et al. | 372/86 |
| 4,718,072 | 1/1988 | Marchetti et al. | 372/86 |

FOREIGN PATENT DOCUMENTS

| | | |
|---|---|---|
| 0150692 | 8/1985 | European Pat. Off. . |
| 0167746 | 1/1986 | European Pat. Off. . |
| 63-133583 | 10/1988 | Japan . |
| 63-217684 | 1/1989 | Japan . |
| 1-080081 | 7/1989 | Japan . |

OTHER PUBLICATIONS

J. Appl. Phys. 56 (11), Dec. 1, 1984, A new type of corona-discharge photoionization source for gas Lasers.

*Primary Examiner*—Léon Scott, Jr.
*Attorney, Agent, or Firm*—Sughrue, Mion, Zinn, Macpeak & Seas

[57] ABSTRACT

A pulsed transversely excited gas laser device includes a pair of main electrodes having main surfaces opposing each other across a main discharge gap and extending along the optical axis of the laser. A corona discharge preionizer for radiating ultraviolet radiation is substantially accommodated within a recess formed on the main surface of one of the main electrodes at an upstream side of the foot of the main discharge 3. The corona discharge preionizer is separated from the inner wall and bottom surface of the recess except at a surface portion thereof which is in contact with a projection extending sideways from a side wall of the recess next to the main discharge. The corona discharge generated over the preionizer radiates ultraviolet radiation to preionize the laser gas.

10 Claims, 2 Drawing Sheets

DISCHARGE EXCITATION PULSED LASER OSCILLATION DEVICE

BACKGROUND OF THE INVENTION

This invention relates to discharge excitation pulsed laser oscillation devices (pulsed transversely excited gas laser devices), and more particularly to the electrode structure of the discharge excitation pulsed laser oscillation devices.

FIG. 2 is a schematic sectional view of a conventional discharge excitation pulsed laser oscillation device (pulsed transversely excited gas laser device), showing a section thereof perpendicular to the optical axis of the laser. The device is disclosed in: R. Marchetti and E. Penco, "A new type of corona-discharge photoionization source for gas lasers", Journal of Applied Physics 56(11), December 1984, pp. 3163-3168. In FIG. 2, a pair of main electrodes 1 and 2 opposing each other extend parallel to the optical axis of the laser. Across the main electrodes 1 and 2 is formed a main discharge 3. A laser gas flow 4 is supplied from a laser gas supply device (not shown), along a direction perpendicular to the optical axis of the laser, to the region between the main electrodes 1 and 2.

A pair of preionizers 5 disposed on the upstream and the downstream side (with respect to the direction of the laser gas flow 4) of the main electrodes 1 and 2 preionize the laser gas between the main electrodes 1 and 2 such that the main discharge 3 is generated. Each preionizer 5 consists of: a hollow dielectric pipe 6, an auxiliary electrode 7 inserted into the bore of the dielectric pipe 6, and a conductor wire 8 which is attached over the outer surface of the dielectric pipe 6 and is kept at the same potential as the main electrode 2.

Next, the operation of the discharge excitation pulsed laser oscillation device of FIG. 2 is described. First, the laser gas is supplied from a laser gas supply device to the region between the main electrodes 1 and 2. When a voltage is applied across the main electrode 2 and each of the auxiliary electrodes 7, the corona discharge 9 starts from the point at which the conductor wire 8 and the dielectric pipe 6 are in contact and covers the outer surface of the dielectric pipe 6. The ultraviolet radiation radiated from the corona discharge 9 preionizes the laser gas between the main electrodes 1 and 2. Next, upon application of a voltage across the main electrodes 1 and 2, the preionized laser gas begins to discharge, and the main discharge 3 is generated across the main electrode 1 and main electrode 2. The laser gas is excited by the main discharge 3, such that the laser commences to oscillate in a direction perpendicular to the surface of the drawing in FIG. 2.

In the case of the discharge excitation pulsed laser oscillation device of FIG. 2, the discharge remnants, such as the ions and metastable gas molecules and atoms generated by the main discharge 3, and particles sputtered out from the electrodes, are carried downstream with the laser gas flow 4. By the time when the next main discharge 3 is started by the subsequent voltage pulse, the new laser gas is supplied to the region between the main electrodes 1 and 2 and the ultraviolet radiation is radiated thereto from both sides. Thus, the number of preionized electrons (photoelectrons) remains constant and the distribution thereof is symmetric for the upstream and the downstream side (with respect to the laser gas flow 4) in the region between the main electrodes 1 and 2. Thus, the main discharge 3 is maintained constant throughout the operation.

FIG. 3 is a schematic sectional view of a conventional discharge excitation excimer laser oscillation device. The device is disclosed in: T. S. Fahlen, "HIGH-AVERAGE-POWER EXCIMER LASER", DOE/SF/90024-T2,1977, United States Energy Research and Development Administration. A tube 1a having an outer diameter of ¼ inches is mounted on an end of a main electrode 1 opposing the other main electrode 2. The preionizer 5, including a hollow dielectric pipe 6 and an auxiliary electrode 7 which consists of a wire inserted into the bore of the dielectric pipe 6, is disposed at the downstream side (with respect to the laser gas flow 4) of the main electrode 1 such that the dielectric pipe 6 is partly in contact with the main electrode 1.

The operation of the laser device of FIG. 3 is similar to that of the laser device of FIG. 2. After the laser gas is supplied to the region between the main electrodes 1 and 2, a voltage is applied across the main electrode 1 and the auxiliary electrode 7, such that the corona discharge 9 is generated from the point where the main electrode 1 and the dielectric pipe 6 are in contact, and thence covers the whole dielectric pipe 6. The laser gas between the main electrodes 1 and 2 is preionized by the ultraviolet radiation radiated from the corona discharge 9. When a voltage is applied across the main electrodes 1 and 2, the preionized laser gas commences to discharge, thereby generating the main discharge 3. The laser gas is excited by the main discharge 3, such that the laser oscillates in the direction perpendicular to the surface of the drawing. The preionizer 5 is disposed only at the downstream side of the main electrode 1. Thus, this excimer laser device has a simplified structure.

The above conventional laser devices have the following disadvantages.

In the case of the device of FIG. 2, the preionizers 5 are disposed on both the upstream and downstream side (with respect to the laser gas flow 4) of the main electrodes 1 and 2. However, the ultraviolet radiation radiated from the preionizer 5 at the downstream side is absorbed by the discharge remnants generated by the main discharge 3. Thus, as the oscillation frequency increases, the center of the distribution of preionized electrons (photoelectrons) is shifted to the upstream side. Thus, as shown in FIG. 4, the central position of the laser beam is also shifted to the upstream side (with respect to the laser gas flow 4) as the oscillation frequency increases.

On the other hand, in the case of the laser device of FIG. 3, the preionizer 5 is disposed only at the downstream side (with respect to the laser gas flow 4) of the main electrodes 1 and 2. The ultraviolet radiation radiated from the preionizer 5 is absorbed by the discharge remnants generated by the main discharge 3. Thus, as the oscillation frequency increases, the number of preionized electrons decreases, and the homogeneity of the main discharge 3 is deteriorated. As a result, the energy is not effectively deposited into the laser gas. Thus the laser oscillation efficiency deteriorates and the output power decreases. Thus, it is necessary to substitute the laser gas between the main electrodes 1 and 2 by a new volume of the laser gas by the time when the next main discharge 3 is generated. To accomplish this, a laser gas supply device of large capacity becomes necessary.

SUMMARY OF THE INVENTION

It is therefore an object of this invention to provide a discharge excitation pulsed laser oscillation device by which the output power can be maintained even with a laser gas supply device of smaller capacity, and the central position of the output laser beam is fixed irrespective of the oscillation frequency.

The above object is accomplished in accordance with the principle of this invention by a discharge excitation pulsed laser oscillation device which comprises a pair of main electrodes having main surfaces opposing each other across a main discharge gap and extending along an optical axis of the laser, wherein one of the main electrodes has a recess formed on the main surface thereof to an upstream side of a location where a foot of a main discharge across the main electrodes is formed; laser gas supply means for supplying a laser gas to a main discharge gap region between the pair of main electrodes; and a preionizer means substantially accommodated within the recess formed on the one of the main electrodes. Preferably, the preionizer means is a corona discharge preionizer which comprises: a dielectric pipe substantially accommodated within the recess, and an auxiliary electrode inserted in the dielectric pipe.

It is further preferred that a side wall of the recess has a projection extending sideways therefrom to contact with an outer surface portion of the preionizer, the preionizer being separated from the recess except at the outer surface portion in contact with the projection.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
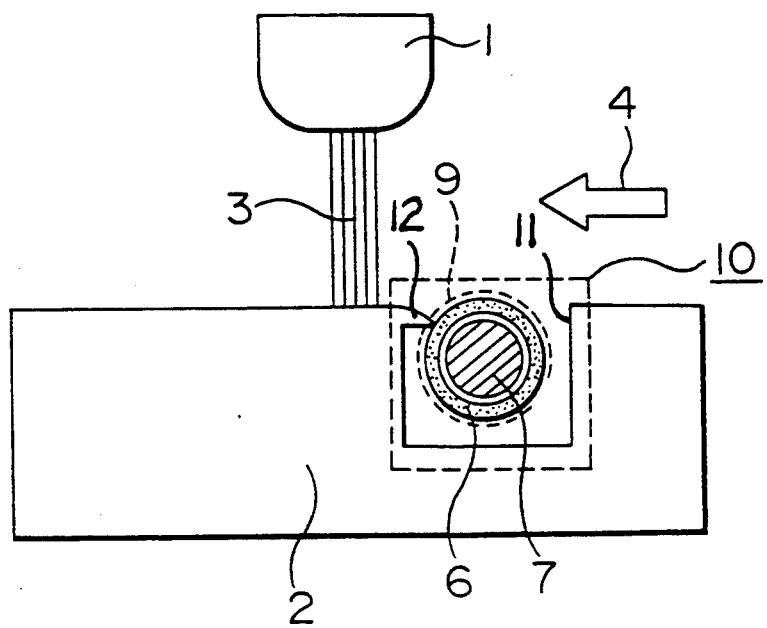
FIG. 1 is a schematic sectional view of a discharge excitation pulsed laser oscillation device according to an embodiment of this invention.

FIG. 1 is a schematic sectional view of a discharge excitation pulsed laser oscillation device according to an embodiment of this invention. In FIG. 1, the parts 1 through 9 correspond to those described above with reference to FIGS. 2 and 3.

A main electrode 1 opposes another main electrode 2 to form a main discharge 3 therebetween. The laser gas flow 4 is supplied from a laser gas supply device (not shown) disposed to the right of the main electrodes 1 and 2 in FIG. 1. A preionizer 10 is substantially accommodated within a recess 11 formed on the substantially flat upper surface near the location thereof where the foot of the main discharge 3 is formed. The recess 11 is formed at the upstream side of the main discharge 3 with respect to the laser gas flow 4. The preionizer 10 includes a hollow dielectric pipe 6, and an auxiliary electrode 7 inserted within the dielectric pipe 6. The dielectric pipe 6 is separated by a gap from the walls of the recess 11 of the main electrode 2, except at a portion which is in contact with a projection (shown at the upper left corner of the recess 11 in FIG. 1) formed on a side wall of the recess 11 next to the main discharge 3. The dielectric pipe 6 is made of an alumina ceramic consisting primarily of alumina.

Next the operation of the laser device of FIG. 1 is described. After the laser gas is supplied to the region between the main electrodes 1 and 2, a voltage pulse is applied across the main electrode 2 and the auxiliary electrode 7. As a result, the corona discharge 9 is generated from the point at which the main electrode 2 and the dielectric pipe 6 are in contact, and thence covers the whole outer surface of the dielectric pipe 6. An ultraviolet radiation is radiated from the corona discharge 9, such that the laser gas between the main electrodes 1 and 2 is preionized. Thereafter, when a voltage pulse is applied across the main electrodes 1 and 2, the preionized laser gas starts to discharge and the main discharge 3 is generated thereacross. The laser gas is excited by the main discharge 3, such that the laser oscillates in a direction perpendicular to the surface of the drawing (transversely excited gas laser).

Discharge remnants generated by the main discharge 3 are carried away by the laser gas flow 4 to the downstream side by the time when the next discharge begins, and a new volume of the laser gas supplied from the laser gas supply device replaces the region between the main electrodes 1 and 2. By repeating the above operations, the laser oscillation is repeated.

As described above, the dielectric pipe 6 is substantially embedded within the recess 11 of the main electrode 2. Thus, the dielectric pipe 6 does not obstruct the laser gas flow 4, and the laser gas flow 4 is supplied at a high flow rate. Further, by selecting the gap width (separation) between the main electrode 2 and the dielectric pipe 6 at a value greater than the thickness of the dielectric pipe 6, the progression length of the corona discharge 9 can be increased, thereby augmenting the amount of preionized gas.

Figure 2:
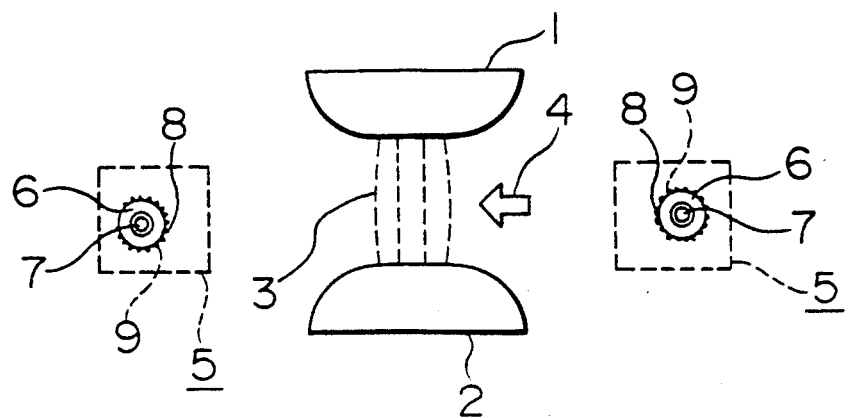
FIG. 2 is a schematic sectional view of a conventional discharge excitation pulsed laser oscillation device (pulsed transversely excited gas laser device), showing a section thereof perpendicular to the optical axis of the laser.

As described above, in the case of the conventional laser oscillation device of FIG. 2, the central position of the laser beam is shifted accompanying the variation of the oscillation frequency (pulse repetition frequency). In the case of this embodiment, however, the central position of the laser beam remains fixed over the oscillation frequency (pulse repetition frequency) range of from 1 to 1000 Hz.

Figure 3:
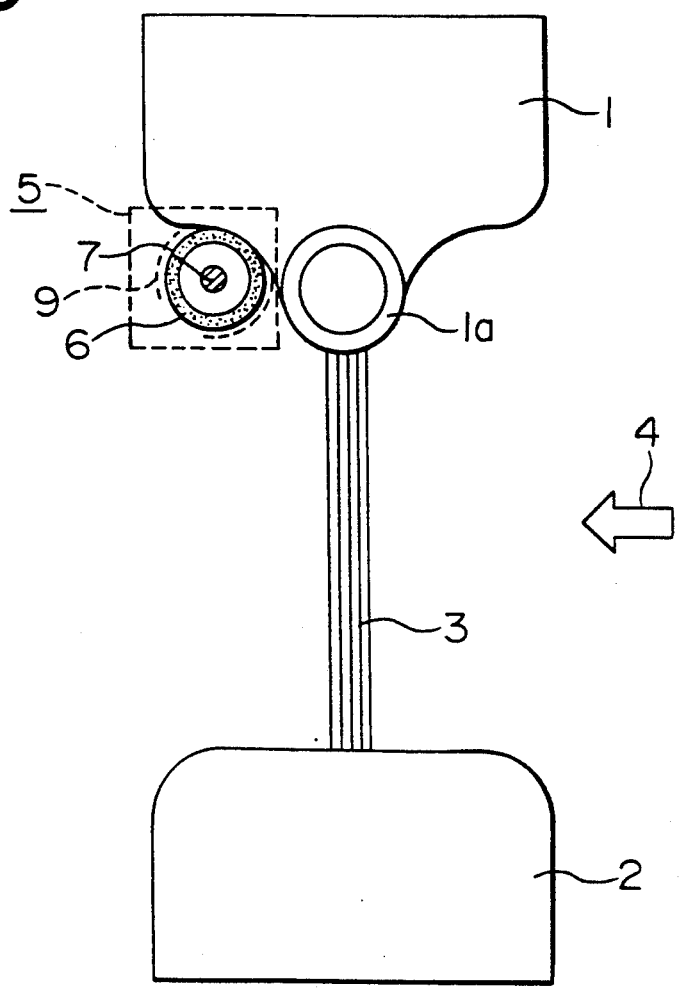
FIG. 3 is a schematic sectional view of a conventional discharge excitation excimer laser oscillation device.
Figure 4:
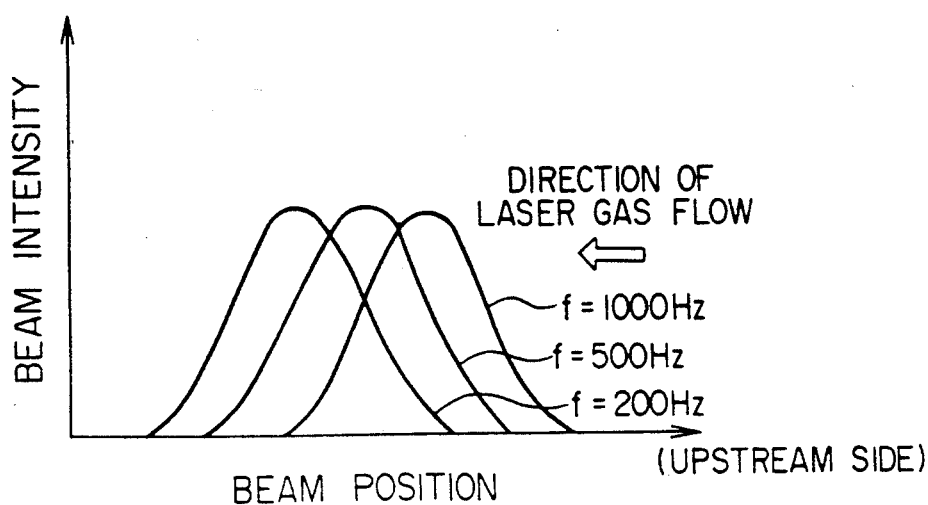
FIG. 4 is a diagram showing the shift of the central position of the laser beam accompanying the increase of the laser oscillation frequency.

Further, the laser gas flow 4 is not obstructed by the preionizer 10 and effectively carries away the remnants which absorb the ultraviolet radiation and deteriorates the efficiency of laser oscillation. Thus, a laser gas supply device having half the supply capacity as that of the laser device of FIG. 3 is sufficient for maintaining the same level of output laser power under identical conditions.

The absorption of the ultraviolet radiation by the discharge remnants is negligible for the discharge excitation pulsed laser oscillation device according to this invention. Thus, irrespective of the laser oscillation frequency, the distribution and the amount of the preionized electrons (photoelectrons) are maintained constant. Thus, the homogeneity of the main discharge 3 is maintained throughout the operation and a stable laser oscillation is realized.

According to this invention, a high level of the laser output power is maintained even at a high oscillation frequency. This is particularly manifest when the laser gas includes a gas having a high affinity to electrons, such as HCl and $F_2$, and especially for the KrF, ArF, and $F_2$ excimer lasers.

Further, according to this invention, the central position of the laser beam is fixed. This is confirmed, not only for the excimer lasers, but also for TEA $CO_2$ laser.

Furthermore, in the case of the above embodiment, the preionizer generates a corona discharge for preionizing the laser gas. However, the preionizer may generate an arc discharge for the same purpose. Even then, the central position of the laser beam is not shifted with the variation of the oscillation frequency. However, a large amount of energy is deposited from the arc discharge to the laser gas at the upstream side, to raise the temperature of the laser gas. Thus, a laser gas supply device of a relatively large capacity becomes necessary for maintaining a high output power level.

What is claimed is:

1. A discharge excitation pulsed laser oscillation device comprising:
   a pair of main electrodes having main surfaces opposing each other across a main discharge gap region and extending along an optical axis of said pulsed laser oscillation device;
   laser gas supply means for supplying a laser gas to the main discharge gap region between said pair of main electrodes; and
   preionizer means for preionizing the laser gas in the main discharge gap region, said preionizer means being exclusively disposed on an upstream side of the main discharge gap region with respect to a flow direction of the laser gas;
   wherein one of said main electrodes has a recess formed on the main surface thereof on an upstream side of a location where a base of a main discharge across said main electrodes is formed, said preionizer means being substantially disposed within the recess formed on said one of said main electrodes.

2. A discharge excitation pulsed laser oscillation device as claimed in claim 1, wherein said preionizer means is a corona discharge preionizer.

3. A discharge excitation pulsed laser oscillation device as claimed in claim 2, wherein said preionizer means comprises a dielectric pipe, and an auxiliary electrode inserted in said dielectric pipe.

4. A discharge excitation pulsed laser oscillation device as claimed in claim 3, wherein one of said main electrodes has a projection, said dielectric pipe of said preionizer means contacting with said one of said main electrodes only at said projection.

5. A discharge excitation pulsed laser oscillation device as claimed in claim 1, wherein the main surfaces of said main electrodes are substantially flat.

6. A discharge excitation pulsed laser oscillation device comprising:
   a pair of main electrodes having main surfaces opposing each other across a main discharge gap region and extending along an optical axis of said pulsed laser oscillation device;
   a laser gas supply for supplying a laser gas to the main discharge gap region between said pair of main electrodes; and
   a preionizer for preionizing the laser gas in the main discharge gap region, said preionizer being exclusively disposed on an upstream side of the main discharge gap region with respect to a flow direction of the laser gas;
   wherein one of said main electrodes has a recess formed on the main surface thereof on an upstream side of a location where a base of a main discharge across said main electrodes is formed, said preionizer being substantially disposed within the recess formed on said one of said main electrodes.

7. A discharge excitation pulsed laser oscillation device as claimed in claim 6, wherein said preionizer is a corona discharge preionizer.

8. A discharge excitation pulsed laser oscillation device as claimed in claim 7, wherein said preionizer comprises a dielectric pipe and an auxiliary electrode inserted in said dielectric pipe.

9. A discharge excitation pulsed laser oscillation device as claimed in claim 8, wherein one of said main electrodes has a projection, said dielectric pipe of said preionizer contacting with said one of said main electrodes only at said projection.

10. A discharge excitation pulsed laser oscillation device as claimed in claim 6, wherein the main surfaces of said main electrodes are substantially flat.

* * * * *